Nov. 10, 1936.  M. G. CROSBY  2,060,611
RECEIVING SYSTEM
Filed Dec. 23, 1933  2 Sheets—Sheet 2
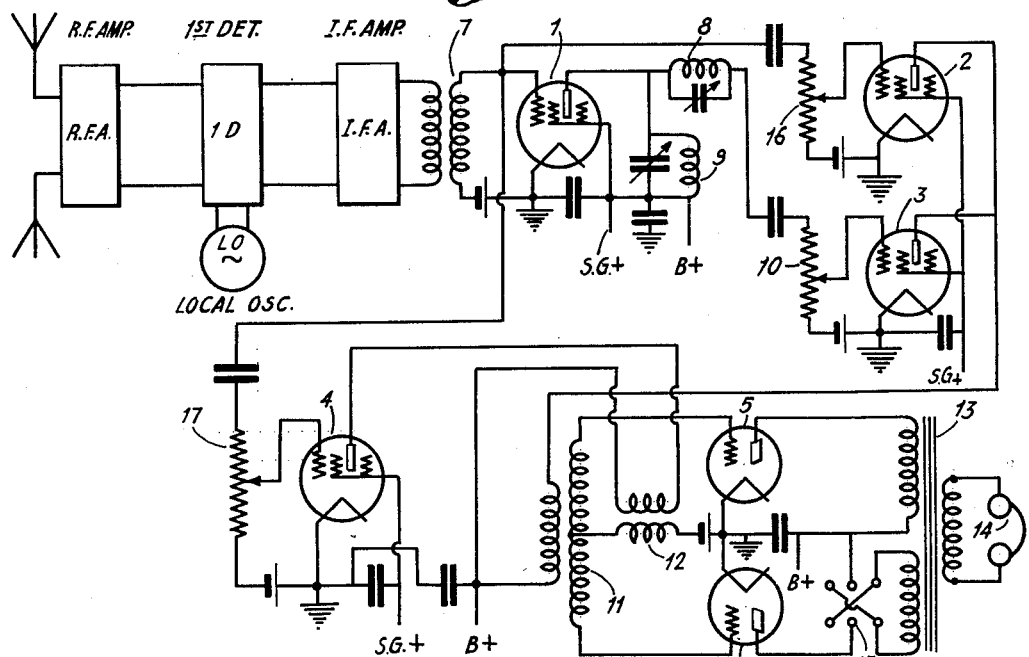
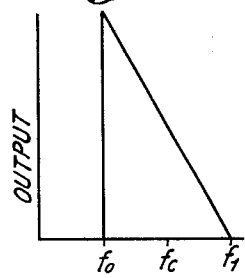
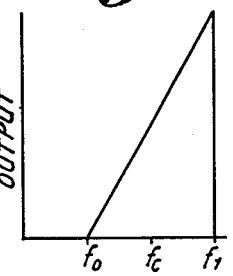
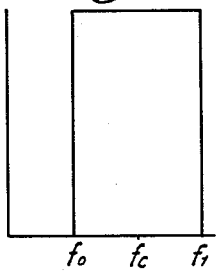
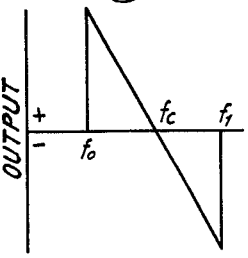
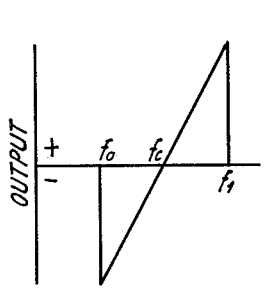
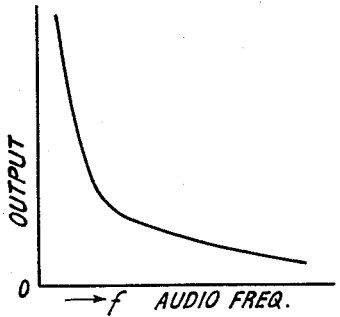
INVENTOR
MURRAY G. CROSBY
BY
ATTORNEY Patented Nov. 10, 1936

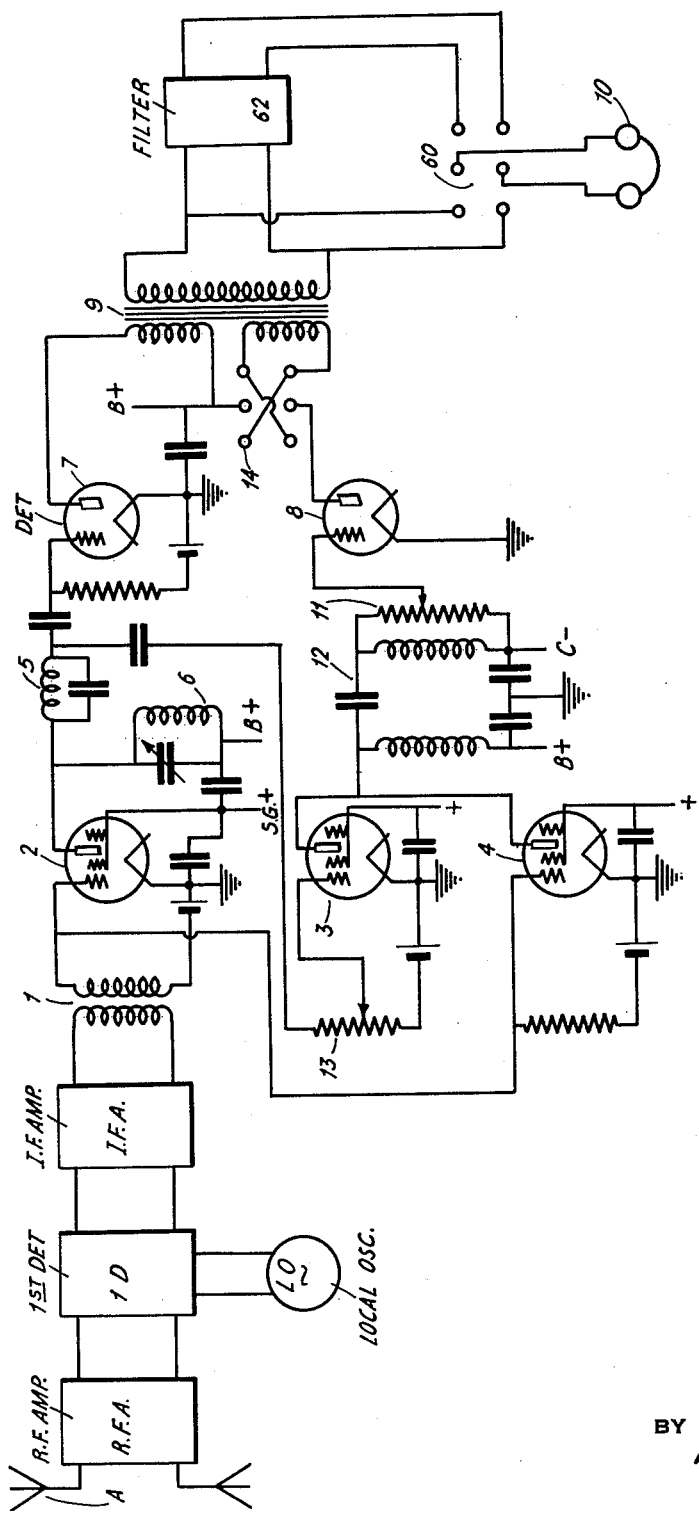

2,060,611

UNITED STATES PATENT OFFICE 2,060,611

RECEIVING SYSTEM

Murray G. Crosby, Riverhead, N. Y., assignor to Radio Corporation of America, a corporation of Delaware Application December 23, 1933, Serial No. 703,770

14 Claims. (Cl. 250—20)

My present invention relates to the reception of modulated carrier energy and in particular discloses a single filter modulation receiver particularly adapted for the translation of phase and frequency modulated waves.

Heretofore it has been proposed to convert, for example, frequency modulated waves into amplitude modulated waves for detection purposes by utilization of two filters with slopes or characteristics of opposite sign, the characteristics being obtained by plotting output of the filter against applied frequency input. The outputs of these two filters or circuits give amplitude modulated waves whose envelopes are 180° degrees apart in phase. Each filter output is detected separately and the audio outputs are combined either in series or in parallel so that they are additive depending upon whether or not amplitude or phase or frequency modulated waves are being dealt with. By such an arrangement second harmonic square-law detection distortion is cancelled and a balance is obtained on amplitude modulation so that detection is rendered more perfect and there is an appreciable reduction of noise and interference.

The foregoing system, however, has certain drawbacks in practice. The filters must be adjusted to have a minimum output at one end of their band width and a maximum at the other end with a mean output at the mid-band point where the carrier is tuned. To produce two such filters of opposite slope and proper symmetry is a tedious process requiring either extremely accurate calculations or an extended series of cut and try measurements or a combination of both of these processes. To reduce these disadvantages is one of the principal objects of my present invention and in carrying it into effect I have provided a receiver wherein all of the advantages of the receiver having two filters each of sloping characteristic are obtained while using only one filter of sloping characteristic. It naturally follows that an important advantage of my present invention resides in the reduction of time for adjustments by at least one-half. More specifically, in carrying out my present invention I obtain the effect of the second filter by means of a balancing or combining arrangement so that the effect and advantages of two separate converting filters are present while using only one.

In the accompanying drawings, which are only illustrative of my present invention and are not to be considered in any way limitative, Figures 1 and 2 are wiring diagrams of receiving systems in which the effects of two filters having opposite slopes are obtained with a single filter having a predetermined slope; and, Figures 3 to 8 inclusive are curves explanatory of my present invention.

Turning to Figure 1, energy received upon an antenna A is fed to a radio frequency amplifier RFA whose output is fed to a first detector or demodulator ID. The first detector ID is also supplied with waves from a local oscillator LO and the resulting beat frequency output is fed to an intermediate frequency amplifier IFA. The intermediate frequency output is fed at transformer I into multi-electrode vacuum, or screen grid tubes, or electron discharge devices 2 and 4. The output of tube 2 is filtered by filter sections 5 and 6 and thence fed to detector tube 7 and combining tube 3. The output of tube 4 is combined with the output of tube 3 through the impedance coupling 12. Potentiometer 13 controls the volume from the filter 5, 6 of sloping characteristic, and potentiometer 11 regulates the voltage to detector tube 8 so that it is equal to that fed to detector 7. Transformer 9 combines the audio outputs of the two detectors. Receivers 10 utilize the detected output for audio reception. Switch 14 regulates the phase of combination of the audio outputs of the two detectors, and switch 60 causes the detected outputs to flow through filter 62, in certain instances, before reaching receiver 10.

The principle of the operation of a back-to-back type of frequency modulation receiver requires that one detector be fed by the signal passed through a filter of positive slope as shown in Figure 4 and the other detector by a filter of negative slope as shown in Figure 3. Ordinarily two filters having these slopes are built separately. However, by combining a filter of one slope with a filter of flat top characteristic as given by Figure 5, a filter of opposite slope may be obtained. For instance, the output of a filter of the character illustrated in Figure 3 could be subtracted from the output of a filter of the character illustrated in Figure 5 and the resultant would be a negative slope filter as given by Figure 4. In this manner the output of the filter 5, 6 in Figure 1 could be given by Figure 3 where $f_c$ is the carrier frequency and $f_0$, $f_1$ the band limits. The output of tube 4 is an aperiodic amplification of the signal giving a flat top characteristic like that of Figure 5 although not necessarily a band-pass action as Figure 5 portrays. (In Figures 3, 4, 5 and 6 the characteristics are assumed to be ideal so that the filters cut-off at the outer limits of the received wave band; in the actual case this would only be approximated.) The combination of the outputs of tubes 3 and 4 is in reality a subtraction of the characteristic of Figure 3 from that of Figure 5 so that Figure 4 is obtained. Thus, the slope of the filter has been reversed; hence feeding the output of the filter directly to one detector tube, and reversing the slope for the other, gives the equivalence of two filters and a back-to-back action. Tubes 3 and 4 then, merely function to apply the output of the one filter with its slope reversed, to the detector 8. The inputs to the two detectors are balanced by means of the potentiometer 11.

For the reception of phase or frequency modulation the use of opposite slope demodulating filters causes the resulting two amplitude modulations fed to the detectors to be 180 degrees out of phase. To make the detected outputs add, they are combined in the transformer 9 with the series or pushpull connection to produce a 180 degree reversal of phase of one output. In the case of amplitude modulation, however, the phase of the modulation is unaffected by the demodulating filters and the parallel connection of transformer 9 is used. As a result of the back-to-back action on the reception of phase or frequency modulation, the detector square-law distortions are balanced out and an improved detection results. Also due to the fact that in the normal reception of phase or frequency modulation, the amplitude modulation is balanced out, a reduction in certain kinds of interference is obtainable.

In Figure 2 the received, heterodyned signal is fed in at transformer 7 to tubes 1, 2 and 4. The output of tube 1 is filtered by the filter elements 8 and 9 and thence fed to tube 3 through potentiometer 10. The output of tube 3 is combined with the output of tube 2 in the primary of transformer 11. Potentiometer 16 controls the input to tube 2. The transformer 11 feeds the grids of the detectors 5 and 6 in phase opposition while the transformer 12, fed by tube 4, feeds the detectors cophasally. Potentiometer 17 controls the input to tube 4. The detected outputs are combined in the transformer 13 and the phase of combination is regulated by switch 15. The audio output is utilized by receivers 14. If desired, the grids may be fed by 11 cophasally and by 12 antiphasally.

The receiver of Figure 2 works on the same principle as the one of Figure 1 except the combinations are made in a different manner. A balance is obtained between the filtered output of tube 3 and the unfiltered output of tube 2 to obtain an overall characteristic as given by Figure 6. Thus, the filtered output as given by Figure 3 would be combined with the output of an amplifier having a linear or flat topped characteristic over the range of frequencies passed as illustrated in Figure 5, so that at carrier frequency the combined output of tubes 2 and 3 is zero, as shown in Figure 6. Then, on one side of the carrier frequency the phase of the output energy will be positive, and on the other side, negative. This combined output, as given by Figure 6, is then combined in one detector grid circuit, say, that of tube 5, with the output of an amplifier, say tube 4, having a linear or flat topped output characteristic over the frequency range to simulate a sloping filter characteristic of positive slope, and, in the other detector grid circuit, say that of tube 6, with the output of amplifier 4, which is of flat topped characteristic to simulate a sloping filter characteristic of negative slope as illustrated in Figure 3. That is, one detector, say 6, receives energy of a character which would result from combining the outputs from filters having characteristics as shown in Figure 6 and Figure 5 to produce a characteristic as illustrated in Figure 3, and the other detector, say 5, receives energy of a character which would result from combining the output from filters having characteristics as shown in Figure 7 and Figure 5 to produce a characteristic as illustrated in Figure 4.

Obviously, the circuits are not limited to the kind of tubes shown, any form of electron discharge device or any type of poly-electrode tubes may be used.

When the receiver is used for phase modulation reception, an audio frequency correcting network should be used on the output. This correcting network may be inserted as shown at 62 in Figure 1 and takes the form of a filter whose output is inversely proportional to the audio frequency, as shown in Figure 8. Moreover, such a filter system is described more fully in my copending application Serial Number 618,154, filed June 20, 1932.

This type of receiver also has advantages in amplitude modulation reception. When using the parallel detector connection and both detectors operating, there is a reduction of square-law detector distortion. When using either filter combination separately, the receiver has interference reducing properties when the interference is confined to one side of the wave. This advantage is also present when receiving phase and frequency modulation. The quality of reception of amplitude modulation on either of the receivers is unimpaired by the filter characteristics.

While superheterodyne types of receivers have been illustrated, the invention is not limited thereto, but the received carrier energy may be directly applied or applied in amplified form to the transformers 1 or 7. Also, the filters illustrated are merely illustrative and any other form giving the proper characteristic may be used. Moreover, simply the output of tube 7 of Figure 1 may be used if desired, or, tube 7 may be dispensed with and for output purposes tube 8 relied upon alone.

Having thus described my invention, what I claim is:

1. In combination, an electron discharge device having an input circuit and an output circuit, a filter of sloping characteristic in one of said circuits whereby said device and output circuit and filter have, overall, a sloping characteristic, means for feeding modulated carrier energy to said input circuit, a vacuum tube detector having an input circuit and an output circuit, a filter of flat topped characteristic in one of said circuits, whereby said vacuum tube and output circuit and flat topped filter have, overall, a flat topped characteristic, means for feeding modulated carrier energy to the input circuit of said vacuum tube detector, means for feeding energies from the output circuit of said device to the input circuit of said tube, whereby said combined energies are detected, means for separately detecting energy from the output circuit of said electron discharge device, means for combining the detected energies, and means for translating the detected energies.

2. In combination, a filter circuit having a sloping characteristic, means for causing the flow of signal modulated energy therethrough, a circuit having a flat topped characteristic, means for causing the flow of signal modulated energy therethrough, means for combining the energies passed by both of said circuits, a third circuit having a flat topped characteristic, means for causing a flow of signal modulated energy therethrough, a differential detector comprising a pair of tubes each having an input electrode, means for applying the combined energy and the energies passed by said third circuit to said differential detector, and means for translating the output of said differential detector.

3. Apparatus as claimed in the preceding claim characterized by the fact that said combined energies are applied antiphasally to the control electrodes of said differential detectors, and being further characterized by the fact that the energy passed by said third circuit is applied cophasally to the control electrodes of said differential detectors.

4. A receiving system comprising means for receiving transmitted modulated carrier energy, a filter circuit having a sloping characteristic connected to said first named means whereby the received energy is fed to said filter, a detector connected to said filter whereby energy from the output of said filter is fed to said detector, a second detector connected to said first named means whereby received energy is fed to said second detector, a connection between said second detector and said filter whereby a portion of said filtered received energy is fed to said second detector, and means for utilizing the outputs of said detectors.

5. Apparatus as claimed in the preceding claim characterized by the fact that means are provided for combining the outputs of said detectors in relative phase opposition.

6. Apparatus as claimed in claim 4 wherein means are provided for combining the outputs of said detectors in parallel.

7. In a system for converting phase or frequency modulated waves to amplitude modulated waves, a filter circuit having a sloping characteristic, means connected with said filter for feeding the phase or frequency modulated waves to said filter whereby the output of said filter when so fed contains amplitude modulation components of one polarity, a circuit having a flat topped characteristic, means connected to said last named circuit for feeding phase or frequency modulated waves thereto, and means connecting the output of said first filter to said circuit having a flat topped characteristic for feeding a portion of the output of said filter having a sloping characteristic to said circuit having a flat topped characteristic, whereby the output of said circuit having a flat topped characteristic contains amplitude modulated components of a polarity opposite to the polarity of the aforesaid components.

8. Apparatus as claimed in the preceding claim characterized by the fact that detecting means are connected with said filter and with said circuit of flat topped characteristic for separately detecting output energies of said filter and said circuit and additional means are connected with said detecting means for combining the outputs of the detecting means.

9. Means for converting phase or frequency modulations on a carrier wave into amplitude variations comprising, phase or frequency modulated carrier wave absorbing means, a filter circuit comprising series and parallel reactances coupled at its input to said absorbing means, said filter circuit having a sloping characteristic, a second filter circuit comprising series and parallel reactances coupled at its input to said absorbing means, said second filter circuit having a substantially flat topped characteristic, means for impressing energy from the output of said first named filter circuit on the input of said second named filter circuit to combine in said second named filter circuit energy passed by said filter of sloping characteristic with energy passed by said filter of substantially flat topped characteristic to obtain a filter effect of a slope opposite to the slope of said first named filter, and detecting and combining means connected with the output of said first named filter and said second named filter.

10. In a system for converting phase or frequency modulations on a carrier wave into characteristic amplitude modulations, a filter circuit comprising series reactances of different character and parallel reactances of different character, said filter circuit having a sloping characteristic, a second filter circuit comprising series reactances and parallel reactances of like character, said second filter having a flat topped characteristic, means for impressing phase or frequency modulated waves on the input of both of said filters, means for impressing energy from the output of said first named filter on the input of said second named filter, and signal combining and demodulating means connected with the output of said second named filter.

11. In apparatus for deriving intelligence from modulated carrier energy, a circuit having a sloping characteristic, said circuit having an input and output, means for impressing modulated wave energy on the input of said circuit to cause the same to flow through said circuit, an additional circuit having a flat topped characteristic, said additional circuit having an input and an output, means coupling the input of said additional circuit to the output of said first named circuit, means for impressing a second portion of modulated energy on the input of said additional circuit to cause said modulated energy to flow through said additional circuit, means connected with the output of both of said circuits for combining the energy passed by both circuits, and means for translating the combined energies.

12. In a system for rendering intelligible signal modulated carrier energy, the combination of a circuit having a sloping characteristic, said circuit having an input and an output, means for impressing modulated carrier energy on the input of said circuit for causing modulated carrier energy to flow through said circuit, a second circuit having a flat topped characteristic and having an input and an output, means coupling the input of said second circuit to the output of said first circuit, means for impressing modulated carrier energy on the input of said second circuit to thereby cause modulated energy to flow through said second circuit, and thermionic means coupled with the outputs of both of said circuits for detecting and combining the energy passed by said first and second circuits.

13. In combination, an electron discharge device having an input circuit and an output circuit, the characteristic of said electron discharge device and its circuits being sloping, means for feeding modulated carrier energy to said input circuit, a vacuum tube having an input circuit and an output circuit the characteristic of said vacuum tube and its circuits being flat topped, means for coupling the input circuit of said vacuum tube to the output circuit of said device, separate means for feeding modulated carrier energy to the output circuit of said vacuum tube, and demodulating means coupled to the output circuits of said tube and said device for demodulating and combining energy from the output circuits of said device and said tube.

14. In a system for demodulating wave energy modulated in frequency or phase or amplitude, a filter circuit tuned to resonance at a frequency outside the band of frequencies in the wave energy to be demodulated, whereby said filter has a sloping bandpass characteristic, said filter having an input and an output, a circuit having a flat topped characteristic for the frequencies of the band of frequencies in the wave energy to be demodulated, said last named circuit having an input and an output, a detector system having input electrodes and output electrodes connected to signal reproducing means, means for impressing wave energy on the input of said filter circuit and on the input of said circuit of flat topped characteristic, means for impressing filtered energy from the output of said filter circuit on the input of said circuit having a flat topped characteristic, and means for impressing energy from the output of filter circuit and from the output of said circuit having a flat topped characteristic on the input electrodes of said detector system.

MURRAY G. CROSBY.